United States Patent [19]

Skoog

[11] 4,349,913

[45] Sep. 14, 1982

[54] METHOD AND APPARATUS FOR REDUCING THE DEMAND ON THE NUMBER OF TRANSFERRED BITS WHEN TRANSFERRING PCM INFORMATION

[75] Inventor: Karl I. L. Skoog, Farsta, Sweden

[73] Assignee: Telefonaktiebolaget L M Ericsson, Stockholm, Sweden

[21] Appl. No.: 154,405

[22] PCT Filed: Dec. 18, 1978

[86] PCT No.: PCT/SE78/00097

§ 371 Date: Aug. 30, 1979

§ 102(e) Date: Jul. 5, 1979

[87] PCT Pub. No.: WO79/00462

PCT Pub. Date: Jul. 26, 1979

[51] Int. Cl.$^3$ .............................................. H04L 3/00
[52] U.S. Cl. ............................... 375/25; 340/347 DD; 340/349
[58] Field of Search ................................... 375/26–33, 375/25; 340/347 DD, 349; 358/13, 261; 371/18

[56] References Cited

U.S. PATENT DOCUMENTS 3,678,389 7/1972 Heers ...................................... 375/26
3,766,542 10/1973 Tomozawa ........................... 375/30

Primary Examiner—Benedict V. Safourek
Assistant Examiner—Stephen Chin
Attorney, Agent, or Firm—Hane, Roberts, Spiecens & Cohen

[57] ABSTRACT

A method and an arrangement for reducing the demand on the number of transferred bits when transferring PCM information. Polarity and amplitude information are transmitted from a transmitter side to a receiver side, expressed by binary code words, while a chosen upper limit in the amplitude code word indicates transition to a segment having a higher number and a chosen lower limit in the amplitude code word indicates transition to a segment having a lower number. The limit values are transmitted to the receiver side and are used on the receiver side as well as on the transmitter side for generating counting signals. The counting signals are registered on the transmitter side and the receiver side for giving a value which expresses the associated segment. By means of the registered value, a control signal is generated in order to increase and decrease respectively the segment value of the transmitted signal.

13 Claims, 2 Drawing Figures

METHOD AND APPARATUS FOR REDUCING THE DEMAND ON THE NUMBER OF TRANSFERRED BITS WHEN TRANSFERRING PCM INFORMATION

FIELD OF INVENTION

The invention relates to a method and an apparatus for reducing the demand on the number of transferred bits when transferring PCM information.

DESCRIPTION OF PRIOR ART

In a known PCM system, the amplitude level of each sample of the incoming analogue signal is expressed in a binary code, the code being divided into partial codes comprising information concerning, for example, the polarity, the associated segment and the amplitude stage of the signal within the segment of the signal sample, i.e. that quantizing threshold within the segment which is nearest to and lower than the level of the signal sample.

SUMMARY OF THE INVENTION

Characteristic of such a system is that the information concerning to which segment the signal sample belongs always has to be transferred in spite of the fact that a change of segment seldom occurs in comparison with the total number of codings. When transferring PCM information between, for example, subscribers and a local exchange through a subscriber's line, great demands are put on the transfer capacity of the line, from which follows that the more bits which are required in the transferred code, the larger band width necessary. This influences the transmission quality and consequently the length of the transfer distance. Furthermore, the codes become more complicated and more expensive the more bits the code must include.

The invention, which solves the above problem, concerns a method characterized in that amplitude and polarity information are transmitted from a transmitter side to a receiver side, expressed by binary code words without any segment code, information concerning the associated segment being transmitted in the form of segment change information, and if the associated segment is to increase a chosen upper limit value in the amplitude information code word is detected on the transmitter side in order to establish that transit to a higher segment is to occur, and if the associated segment is to decrease a detection is carried out for establishing that the amplitude information code word is below a chosen lower limit during a determined time in order to decide that transit to a lower segment is to occur, the limit values being transmitted to the receiver side and being used on the transmitter side as well as on the receiver side in order to generate counting signals, which counting signals are registered on the transmitter as well as on the receiver side for giving a value which expresses the segment association and, by means of the registered value, a control signal is generated in order to increase and decrease respectively the segment value of the transmitted signal.

The invention also concerns an arrangement for carrying out the method and is characterized in that it includes, on the transmitter side, a decoder in order to detect in the signal transferred to the receiver side, that the chosen upper limit value in the amplitude information code word has been reached and to detect and to establish by means of a time measuring circuit that the signal value is below the chosen lower limit value of the amplitude code word during a determined time if so a counting up pulse or a counting down pulse being generated respectively, and a first counter which is stepped upwards or downwards respectively by the counting pulses, so that it defines the associated segment of the signal, the values of the counter providing control signals for circuitry included in the arrangement which is influenced by the control signals and in dependence on the same achieves increasing and decreasing respectively of the segment association of the signal sent out, and, on the receiver side, a decoder for detecting the chosen limit values and generating from the values a positive or negative counting pulse, and a second counter which is stepped upwards or downwards respectively by the counting pulses, so that it indicates the segment association of the received signal, the counting values providing control signals for further circuitry included in the means which is influenced by the control signals and in dependence on the latter achieves decreasing or increasing respectively of the associated segment of the received signal. The invention makes it possible to decrease the number of bits necessary for transmitting information and thus the necessary band width.

BRIEF DESCRIPTION OF THE DRAWINGS

The invention will now be described by way of example with reference to the accompanying drawings, in which.

PREFERRED EMBODIMENTS

Figure 1:
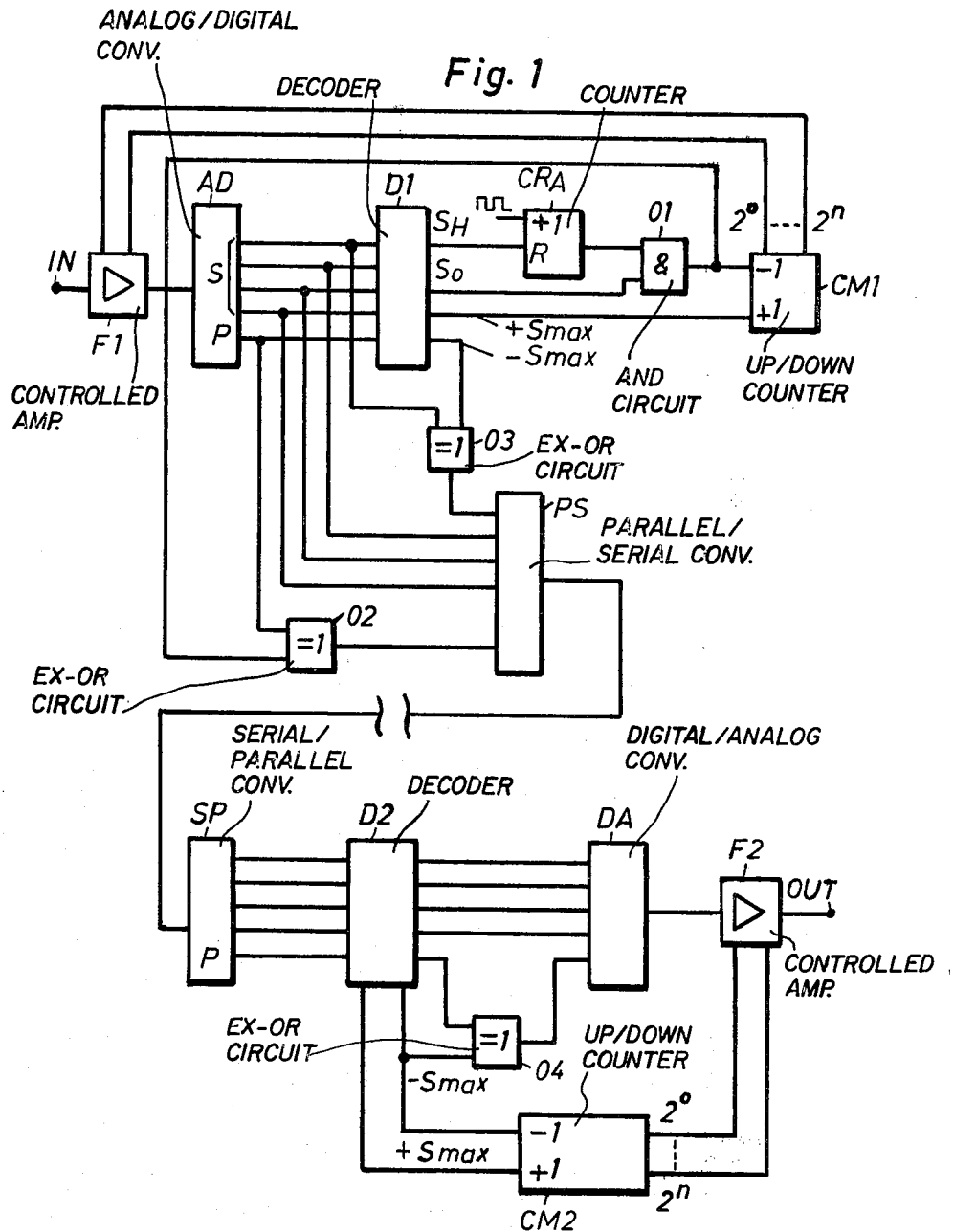
FIG. 1 is a block diagram of one example of an arrangement according to the invention and FIG. 2 is a block diagram of another example of an arrangement according to the invention.

The FIG. 1 example of an arrangement according to the invention comprises, on the transmitter side, a controllable amplifier F1 for adjusting the level of the incoming signal (comprising analogue signal amplitude samples) to the working range of an analogue to digital A/D converter AD connected to the output of the amplifier, by providing amplification or attenuation in dependence on digital control signals incoming to the control inputs of the amplifier. As a result of this, normalized signal amplitudes are obtained as the input signals to the A/D converter AD. By scanning the normalized amplitudes of the signals and only transferring about the segment, i.e. the amplitude range within which the decoding occurs, when a change of segment is necessary, the whole segment determining code can be omitted in the transmission code. Usually the PCM code is constituted by 8 bits divided into one bit of polarity determination, three bits for determination of the associated segment (C-code) and four bits for amplitude determination (S-code). The segment determination is executed in this arrangement according to the invention by means of the amplitude code (S-code) in such a manner that maximum positive amplitude $(+S_{max})$, gives an order of change to the nearest higher segment and that maximum negative amplitude $(-S_{max})$, gives an order of change to the nearest lower segment. In such a way a transmission code is obtained which only comprises five bits, four bits for amplitude determination and one polarity bit.

After A/D conversion in the converter AD, the signals are supplied in parallel form to the inputs of a decoder D1. The signals are supplied according to the example also in parallel form to the inputs of a parallel/series-converter PS. The transfer of signals to the receiver side can occur in parallel form as well. On the outputs of the decoder D1 signals are sent to a control arrangement consisting of a time measuring circuit $CR_A$, a logic circuit 01 and a counter CM1. When the decoder D1 has decoded one signal corresponding to the maximum positive amplitude value with the binary combination 11111, a logical ONE-signal is supplied from the output $+S_{max}$ of the decoder as a counting up signal to a first input of the counter CM1. The counter supplies thereby an output signal to the controllable amplifier F1, which signal indicates that an adjustment to the nearest higher segment is to occur, upon which signals from the amplifier, in order to allow that for example double amplitude values can be measured, are attenuated by a factor 2 which is determined by the signal from the counter CM1.

When changing-over to a lower segment, the operation will be as follows. The time measuring circuit $CR_A$ consists of a counter which, on a ZERO-setting input, senses the most significant bit in each amplitude code transmitted from the output $S_H$ of the decoder D1. The counter receives on a second input counting pulses from a clock signal generator common to the system, not shown in FIG. 1, and steps thereby one position, for example each 10th ms. If output $S_H$ has not been activated, i.e. if the most significant bit has been a logical ZERO all the time until the counter reaches the 8th position, i.e. after 80 ms, a signal is supplied from the counter $CR_A$ to a first input of the logic circuit 01. If the output $S_H$ has been activated before the counter reached the 8th position, the counter is ZERO-set and the counting process is started again. When the decoder D1 has decoded a signal corresponding to the zero level value ($S_O$), i.e. a signal having the binary combination 10000, a logical ONE-signal is supplied from the output $S_O$ of the decoder to a second input of the circuit 01. When the circuit 01 has been activated a counting down signal is supplied to a second input of the counter CM1, which transmits an output signal to the controllable amplifier F1. This output signal indicates that an adjustment to the nearest lower segment is to occur. Consequently, signals from the amplifier are amplified by a factor 2 which is determined by the signal from the counter CM1. Thus, it appears that an adjustment to the nearest higher segment occurs when the binary combination 11111 is decoded, while an adjustment to the nearest lower segment is dependent on the amplitude value having been below a defined amplitude value, according to the example half of the maximum amplitude value, during certain time in combination with the zero level signal 10000 having to appear.

When no segment change is to occur, all the signals are supplied unchanged to the receiver side after conversion in the parallel/series-converter PS.

Also, the receiver side of the system must receive information about possible segment changes. This information is obtained by the codes $+S_{max}$ (11111) upon adjustment to a higher segment and $-S_{max}$ (00000) upon adjustment to a lower segment.

In the case that the decoder D1 transmits a signal corresponding to the code $S_O$ (10000) there are two possibilities, namely either the signal only represents level information which is not connected with a segment change in which case the signal is transmitted unchanged to the receiver side, or the signal is associated with the condition for adjustment to a lower segment. In this case the most significant bit (MSB) in the code has to be inverted, in order that the receiver side should recognizing the signal as an adjustment signal. On the transmitter side the code 00000 is now transmitted, i.e. $-S_{max}$, meaning an order to the receiver side to carry out an adjustment to a lower segment. The inversion of the MSB-bit in the signal $S_O$ occurs in such a manner that the information about the condition of the MSB-bit is transmitted from the A/D converter to one of the inputs of an exclusive OR-circuit O2 the second input of which is activated by the output signal from the circuit 01 i.e. the signal for adjustment to a lower segment. As the zero level signal $S_O$ only constitutes a level indication i.e. no segment change, a logical ONE is obtained on the said one input of the circuit 02. As no ONE-signal for adjustment to a lower segment originates from the circuit 01, a ZERO is obtained on the second input of the circuit O2, whereby the circuit generates a ONE on its output. When the zero level signal is associated with an adjustment to a lower segment the said one input of the circuit O2 still obtains a ONE-signal, while the second input which now is activated from the circuit 01, also obtains a ONE-signal. Consequently, the circuit 02 generates a ZERO-signal on its output and the MSB-bit of the signal is now inverted. Also the signal $-S_{max}$ indicating maximum negative amplitude, can constitute a pure level indication. As the code for $-S_{max}$ is 00000, this signal should not be sent out on the line in this case in order that the receiver side should not mix up this signal with a message of adjustment to a lower segment. Instead the adjacent amplitude level, i.e. 00001 is sent out, which means that the least significant bit, the LSB-bit, in the data word must be inverted, which occurs in an exclusive OR-circuit 03. One input of the circuit 03 is activated by the signal $-S_{max}$ from the decoder D1. To the second input of the circuit 03, a signal is supplied which indicates the condition of the LSB-bit. When the signal $-S_{max}$ has been decoded, the said one input obtains a logical ONE upon which, as the LSB-bit is ZERO, a ONE is produced on the output of the circuit. Upon all other combinations the LSB-bit passes the circuit 03 unchanged.

The data flow incoming in series form is converted on the receiver side to parallel signals in a series/parallel converter SP and is supplied to a digital/analogue (D/A) converter DA. A decoder D2 decodes the signals before the D/A conversion. The decoded signals are converted in the D/A converter so that a normalized analogue signal is sent on the output of the D/A converter. This analogue signal is supplied to the input of a controllable amplifier F2 which, in dependence on control signals incoming to control inputs of the amplifier, removes the normalization by carrying out amplification or attenuation and restores the original analogue signal incoming to the system. From the decoder D2, control signals are transmitted to a counter CM2. When the decoder has decoded a signal corresponding to the maximum positive amplitude ($+S_{max}$), a counting up adjustment signal is supplied to a first input of the counter CM2 which supplies a control signal to the controllable amplifier F2. This control signal indicates that an adjustment to the nearest higher segment has to be carried out, the signal from the amplifier F2 being amplified by a factor 2 which is determined by this control signal. When the decoder D2 has decoded a signal corresponding to the maximum negative amplitude value $-S_{max}$, a counting down signal is transmitted to a second input of the counter CM2 which supplies a control signal to the controllable amplifier F2. This control signal indicates that an adjustment to the nearest lower segment must be carried out. Thus, the signal from the amplifier is attenuated by a factor 2, which is determined by the last mentioned control signal. As, as mentioned before, the message of adjustment to a lower segment from the transmitter side of the system is combined with the zero level signal $S_O$ in which the MSB-bit is inverted, the MSB-bit must be reset on the receiver side before D/A conversion. This is carried out so that the signal relating to the binary condition of the MSB-bit is supplied to one input of an exclusive OR-circuit 04. The second input of the circuit 04 is activated by the signal $-S_{max}$ when it appears, which means that all the signals pass unchanged except the signal 00000 in which the MSB-bit is inverted so that the signal 10000 ($S_O$) is restored.

Below, in tabular form examples are shown how a binary word is composed of part codes indicating polarity, segment and amplitude levels. For the sake of simplicity only the positive part of the signal is shown.

As mentioned earlier, the total amplitude range of the signal is divided into a number of segments where each segment comprises a number of amplitude stages. The amplitude stages within a segment are equal while the amplitude stages within two adjacent segments are related to each other by a factor 2. The size of the amplitude stage within the segment corresopnds to the amplitude value belonging to the least significant bit LSB, for the segment in question.

In known systems a certain amplitude is unambiguously associated with a segment and an amplitude stage, which allows that between successive decodings, the segment and the amplitude stage can be changed to an arbitrary other segment and amplitude stage in dependence on the amplitude value at the actual coding. According to the invention, however, as previously is described, the segment association is determined by a special segment control arrangement, and changes of the segment association are allowed only according to predetermined conditions. According to the example the segment range is chosen in such a way that the first segment has an LSB corresponding to $2^0 = 1$ mV and indicates by in the example 16 amplitude stages the amplitudes 0, 1, 2 ... 15 mV. The next segment has an LSB corresponding to $2^1 = 2$ mV and indicates by 16 amplitude stages the amplitudes 0, 2, 4 ... 30 mV. The further following segment has an LSB corresponding to $2^2 = 4$ mV and indicates by 16 amplitude stages the amplitudes 0, 4, 8 ... 60 mV and so on for following segments. In the table the LSB value for each segment is expressed in a decimal number.

By means of the table examples are shown for a conversion process according to the example. A signal with a large amplitude range is divided into a number of segments of which $C_0$-$C_5$ are shown, where each segment is divided into a number of amplitude stages $S_0$-$S_{15}$. The amplitude difference between amplitude stages within a segment comprises an amplitude range which is determined by the LSB value of the segments 1, 2, 4 and so on. The table shows also the binary representation of the different amplitude stages $S_0$-$S_{15}$.

An amplitude for example 8 mV is indicated on the one hand by segment position indication $C_0$ where the segment LSB according to the above coresopnds to 1 mV, and on the other hand by the amplitude stage indication. The indicated amplitude is obtained from the product of the LSB-value of the segment position and the amplitude stage indication, i.e. in the example $1 \times 8 = 8$ mV. The same amplitude can also be indicated by another segment position indication $C_1$ where the segment, according to the above example, LSB corresponds to 2 mV, and by the amplitude stage indication $S_4$ i.e. according to the example $2 \times 4 = 8$ mV. The amplitude can in a similar manner also be indicated by the segment positions $C_2$ and $C_3$. In a higher segment O is indicated. As appears from the table, a larger precision is achieved when the signal is defined in a lower segment, and in the example of an arrangement according to the invention, by changing the amplification work constantly is carried out within the segment which gives the greatest precision.

| 1 | 1111 | $S_{15}$ | 15 | 30 | 60 | 120 | 240 | 480 |
|---|------|----------|----|----|----|-----|-----|-----|
| 1 | 1110 | $S_{14}$ | 14 | 28 | 56 | 112 | 224 | 448 |
| ↓ | ↓ | | | | | | | |
| ↓ | ↓ | | | | | | | |
| 1 | 1000 | $S_8$ | 8 | 16 | 32 | 64 | 128 | 256 |
| 1 | 0111 | $S_7$ | 7 | 14 | 28 | 56 | 112 | 224 |
| ↓ | ↓ | | | | | | | |
| 1 | 0100 | $S_4$ | 4 | 8 | 16 | 32 | 64 | 128 |
| 1 | 0011 | $S_3$ | 3 | 6 | 12 | 24 | 48 | 96 |
| 1 | 0010 | $S_2$ | 2 | 4 | 8 | 16 | 32 | 64 |
| 1 | 0001 | $S_1$ | 1 | 2 | 4 | 8 | 16 | 32 |
| 1 | 0000 | $S_0$ | 0 | 0 | 0 | 0 | 0 | 0 |
| Pol + S-code | | C | $C_0$ | $C_1$ | $C_2$ | $C_3$ | $C_4$ | $C_5$ and |
| | | LSB | 1 | 2 | 4 | 8 | 16 | 32 so on |

Figure 2:
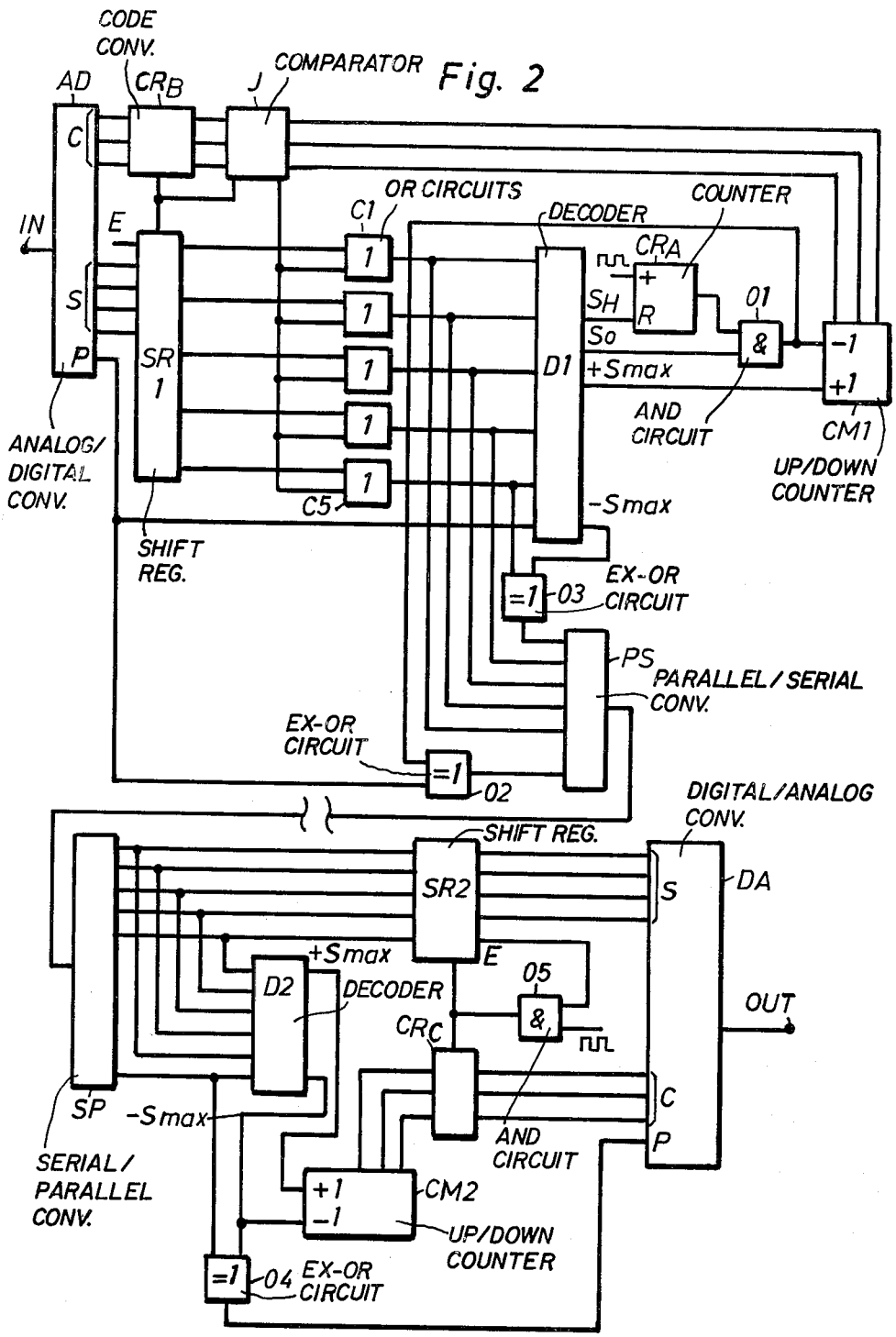

With reference to FIG. 2 a further example of an arrangement according to the invention will be described which cooperates with A/D and D/A converters of conventional type in a PCM system. The A/D converter indicates itself in which segment the coding will take place, while a counter CM1 indicates in which segment the coding should occur. By executing a comparison between the two segment indications the code can be translated and adapted according to this example of the invention. In this example, the amplifier F1 on the transmitter side is omitted and instead a code converter $CR_B$, a comparator J, a shift register SR1 and a number of OR-circuits C1-C5 are added. On the receiver side the amplifier F2 is omitted and instead a code converter $CR_C$, a shift register SR2 and a control circuit 05 are added. Other circuits have the same tasks and functions as described in connection with FIG. 1.

A converter AD converts on the transmitter side each amplitude sample of an incoming analogue signal to a digital signal and transmits this signal on its outputs in parallel form, information about the segment code being supplied to inputs of the code converter $CR_B$ and information about the amplitude code being supplied to inputs of the shift register SR1 and an extra ONE-bit E filling the first position in the register. The polarity bit is supplied directly to an input of the decoder D1. In this example 6 bits are thus utilized in the code word, a polarity bit, four amplitude bits and the extra ONE-bit E. The segment determining value in the counter CM1 is an instantaneous segment value, as to this value can be added or subtracted one (1), in dependence on the control signals on the inputs, in the manner described in connection with FIG. 1. At the earlier mentioned comparison between the segment determining code from the A/D converter and the instantaneous segment value from the counter CM1, the following three cases may occur:
(a) The codes are equal.
(b) The code from the A/D converter is larger than the code from the counter.
(c) The code from the A/D converter is less than the code from the counter.

From the outputs of the code converter $CR_B$ the segment determining code of the A/D converter is sent to inputs of the comparator J. The comparator receives on other inputs the instantaneous segment determining value from the counter CM1, and after that it compares the received codes.

If the comparison shows that the codes are equal and if either $+S_{max}$ or $-S_{max}$ occurs the amplitude code is supplied from the shift register SR1 unchanged via the OR circuits C1-C5 and the parallel/series converter PS, to the receiver side. The said extra bit E always follows the amplitude code to the receiver side.

On the receiver side the signal is subject to a series/-parallel conversion in the converter SP after which the amplitude code unchanged passes to the shift register SR2 and to the input of a digital/analogue converter DA. This D/A converter is of the same type as the A/D converter on the transmitter side and thus requires information about the segment determining code. A decoder D2 decodes the signal and establishes that either $+S_{max}$ or $-S_{max}$ occurs and in consequence of this the contents in the counter CM2 without change is supplied to the D/A converter via the code converter $CR_C$ as the final segment determining code.

If comparison on the transmitter side between the segment code shows that the segment code from the A/D converter is larger than the instantaneous segment determining value, the comparator J sends a logical ONE-signal as a control signal to one of the inputs of all OR-circuits C1-C5. Irrespective of which amplitude code now is transmitted from the shift register SR1, all the outputs of the OR-circuits have the binary value ONE, i.e. the binary combination which corresponds to the maximum positive amplitude value $+S_{max}$. This signal is supplied to the decoder D1 which senses the counting signal to the counter CM1 for increasing its content by one, furthermore, the signal being transmitted in the manner earlier described to the receiver side. The comparator J now carries out a new comparison between the segment codes after the content in the counter CM1 has been increased by one. If a difference still exists, the process is repeated until identity has been obtained.

On the receiver side, the decoder D2 senses the transmitted maximum positive amplitude $+S_{max}$ and sends a counting pulse to the counter CM2 for increasing its contents by one (1), whereupon the newly formed segment value is transmitted to the D/A converter via the code converter $CR_C$.

If the comparison on the transmitter side finally shows that the value from the A/D converter is lower than said momentary segment value, the comparator J sends a control signal which on the one hand constitutes a stepping pulse to the code converter $CR_B$ and increases the content of this by a one (1), and on the other hand constitutes a shifting pulse to the shift register SR1. When the register receives the first shift pulse the amplitude code word in the register is displaced by one step, whereby the least significant bit in the word is shifted out. The extra ONE-bit E written into the first position of the register is now moved to the second position and instead a ZERO is written into the first position.

If the difference between the segment codes at the comparison is so large that one further shift pulse is supplied to the shift register, the extra ONE-bit E is moved to the third position, the ZERO written into the first position is moved to the second position and a new ZERO is written into the first position simultaneously as the bit which now is less significant shifted out. If the code word in the shift register before the shifting had the value 10000 it has consequently after the shifting the value 00100. This new code word is transmitted to the receiver side in unchanged form, as either $+S_{max}$ or $-S_{max}$ can occur. Naturally also the polarity bit is transmitted together with the rest of the code word. The stepping pulse from the comparator J increases the content in the code converter $CR_B$ after which the new value from the code converter is supplied to the comparator J for a new comparison. The process is repeated until the segment code from the A/D converter is equal to the instantaneous segment value from the counter CM1. If the segment code from the A/D conversion at the beginning of the comparison was for example 3, i.e. the defined amplitude is to be decoded in segment 3, and the momentary segment value from the counter CM1 was for example 5, i.e. the most suitable segment for coding the amplitude value is segment 5, the difference is equal to two segment stages. Thus this implies that the code converter $CR_B$ is counted up two stages and that the shift register SR1 receives two shift pulses which displace the written word by two steps.

On the receiver side the received and series/parallel converted code word is supplied on the one hand to inputs of the register SR2 and on the other hand to inputs of the decoder D2. As either $+S_{max}$ or $-S_{max}$ has been received, the decoder does not send out any activating signals from these outputs, in consequence of which the segment determining value earlier written into the counter CM2 is written into the code converter $CR_C$ unchanged. As mentioned, the code word is written without a polarity bit also into the shift register SR2. In order to obtain from this register the signal originally incoming to the transmitter side, this register has to be stepped back as many steps as correspond to the displacement in the register SR1. This occurs in such manner that in the first position of the register SR2 the polarity of the signal is sensed. If this is a ZERO, a signal is sent to a first inverting input of an AND circuit 05 which senses the number of ZERO bits which precede the said extra ONE-bit E. The circuit 05 receives on a second input signals from a clock signal generator, not shown in the drawing, common to the system. When activated, the circuit 05 sends out a control signal which on the one hand steps the shift register upwards one step for each of the ZERO bits received before the ONE-bit E, and on the other hand changes the content of the code converter $CR_C$ so that one (1) is subtracted from the value written in it for each received control signal. When the contents of the register SR2 is shifted two steps corresponding to the first two ZEROS in the received code word, the signal E is detected, which is a logical ONE. The register sends this ONE to the AND circuit 05 which is blocked and no further control signals are supplied to the shift register or the code converter. The shift register now sends the original amplitude code to the converter DA and the code converter $CR_C$ now sends to the converter DA the segment code 3 originally transmitted from the converter AD, as the segment value 5 from the counter CM2 has been reduced two steps by the code conversion in the converter $CR_C$. The polarity bit completes the code word sent out on a special input of the D/A converter. After the D/A conversion the original analogue signal incoming to the transmitter is sent out.

We claim:

1. In a PCM-information transfer system wherein the PCM-words are normally represented by polarity information, a segment code and an amplitude code, said amplitude code indicating a level within an amplitude segment represented by a segment code, the method of transmitting PCM-words representing the amplitude and polarity of an analog signal merely by transforming binary words comprising polarity information and an amplitude code and no segment code whereby the number of bits transferred is reduced, said method comprising: at the transmitter side, analog to digital converting the signal to be transmitted to a signal-polarity bit and an amplitude code sensing for an upper limit value of an amplitude code for generating a first control pulse and sensing for a lower limit value of said amplitude code word to generate a second control pulse, up and down counting said first and second control pulses, respectively, to register a segment value for storage to modify the analog to digital conversions; transmitting from the transmitting side a binary word including a signal-polarity bit and a plurality of bits representing an amplitude code; and at the receiver side, receiving the transmitted binary word, sensing for said upper limit value of a received amplitude code for generating another first control pulse, sensing for a lower limit value of said received amplitude code for generating another second control pulse, up and down counting said other first and second control pulses, respectively to register a segment value for storage, generating by digital-to-analog conversion an analog signal from the received amplitude code, the received signal-polarity bit and the stored segment value.

2. The method of claim 1 wherein the registered segment value is utilized to control the amplitude of the analog signal which is converted to a digital value on the transmitter side; and wherein the registered segment value is utilized to control the amplitude of the analog signal resulting from digital-to-analog conversion on the receiver side.

3. The method of claim 2 wherein the modifications of the analog signals is by factors of two.

4. The method of claim 2 wherein the first control pulses at the transmitter and receiver sides are generated in response to the same upper limit values, the second control pulse at the transmitter side is generated in response to the amplitude value being below a given value for a given period of time, and the other second control pulse at the receiver side is generated directly in response to the reception of a lower limit value.

5. The method of claim 4 wherein the given value is one half the maximum amplitude value.

6. The method of claim 1 wherein the analog-to-digital conversion on the transmitter, further includes generation a segment association value, comparing the generated segment association value with the stored segment value to control the transmission of limit values to the receiver side and the generation of the first and second control pulse.

7. The method of claim 5 wherein when the generated segment value is greater than the stored segment value transmitting an amplitude value equal to said upper limit value and generating one of said first control pulses.

8. The method of claim 6 wherein when the generated segment value is less than the stored segment value transmitting an amplitude value associated with said lower limit value and generating one of said second control pulses.

9. In a PCM-information transfer system wherein the PCM-words transferred from a transmitter to a receiver are normally represented by polarity information, a segmented code and an amplitude code, said amplitude code indicating a level within an amplitude segment represented by a segment code, apparatus for transmitting PCM-words representing the amplitude and polarity of an analog signal merely by transferring binary words comprising polarity information and an amplitude code and no segment code whereby the number of bits transferred is reduced, said apparatus comprising: at the transmitter, analog-to-digital means for converting an analog signal to a digital value, including a polarity value and an amplitude value, means detecting upper and lower limit values of the amplitude values for generating first and second control pulses, respectively, a first up/down counter means for units incrementally and decrementally, respectively, in response to said first and second control pulses, the instantaneous count in said counter means being associated with the segment code of the analog signal and means for transmitting the polarity value and amplitude value, and; at the receiver, second detecting means detecting upper and lower limit values of the received amplitude values for generating other first and second control signals, and second up/down counter means response to said other first and second control signals for unit incrementing and decrementing, respectively, whereby the count value accumulated in said second up/down counter means represents a segment value, and digital-to-analog means for converting the received polarity value, the received amplitude value and the accumulated count value representing a segment value to an analog signal.

10. The apparatus of claim 9 wherein said first detecting means comprises a first decoder means for emitting said first control signal when the amplitude value is a maximum upper limit value and for emitting said second control signal when the amplitude value is less than a given amplitude value for a given period of time; and wherein said second detecting means comprises a second decoder means for generating said first and second other control signals, respectively, in accordance with whether the received amplitude values are said maximum amplitude value or a minimum amplitude value.

11. The apparatus of claim 9 wherein said analog-to-digital converter means comprises a first amplifier receiving the analog signals and being response to the count in said first up/down counter means for modifying the gain thereof, and an analog-to-digital converter for converting the signal from said first amplifier to a digital representation.

12. The apparatus of claim 9 or 11 wherein said digital-to-analog converter means comprises a digital-to-analog converter for converting the received amplitude value to a digital signal, and a second amplifier receiving the analog signal emitted by said digital-to-analog converter and being responsive to the count in said second up/down counter means for modifying the gain thereof and emitting an analog signal having an amplitude dependent on said count.

13. The apparatus of claim 9 wherein said analog-to-digital converter means comprises an analog-to-digital counverter for converting the analog signal to a digital word including an amplitude code and a segment code, a comparator means having one input receiving the segment code and a second input receiving the count in said first up/down counter means for controllably generating the equivalent of a maximum amplitude value, and said first detection means receiving both the amplitude code from said analog-to-digital counverter and the output of said comparator means.

* * * * *